US00RE35659E

United States Patent [19]

Ernst et al.

[11] E Patent Number: Re. 35,659

[45] Reissued Date of Patent: Nov. 11, 1997

[54] ADHESIVE ANCHOR

[75] Inventors: Richard J. Ernst, Palatine; Mark S. Timmerman, Elgin, both of Ill.; Peter G. Ham, Michigan City, Ind.

[73] Assignee: Illinois Tool Works Inc., Glenview, Ill.

[21] Appl. No.: 241,728

[22] Filed: May 12, 1994

Related U.S. Patent Documents

Reissue of:

[64] Patent No.: 5,263,804
Issued: Nov. 23, 1993
Appl. No.: 994,207
Filed: Dec. 21, 1992

[51] Int. Cl.[6] ..... F16B 39/00; F16B 39/02

[52] U.S. Cl. ..... 411/82; 411/258; 411/930; 405/259.5

[58] Field of Search ..... 411/82, 171, 180, 411/258, 930; 405/259.1, 259.5, 259.6; 52/704, 707

[56] References Cited

U.S. PATENT DOCUMENTS

| | | | |
|---|---|---|---|
| 3,392,225 | 7/1968 | Phelan | 411/258 X |
| 4,185,438 | 1/1980 | Fischer | 405/259.5 |
| 4,729,705 | 3/1988 | Higgins | 411/82 |
| 4,752,171 | 6/1988 | Pliml, Jr. | 411/171 |
| 4,812,193 | 3/1989 | Gauron | 411/82 X |
| 4,822,223 | 4/1989 | Williams | 411/82 |
| 4,840,524 | 6/1989 | Bisping et al. | 411/258 |
| 4,893,974 | 1/1990 | Fischer et al. | 411/82 |
| 4,941,785 | 7/1990 | Witten | 411/82 |
| 4,993,900 | 2/1991 | Hugel et al. | 411/82 |
| 5,082,405 | 1/1992 | Witten | 411/258 X |
| 5,104,266 | 4/1992 | Daryoush et al. | 405/259.5 |

FOREIGN PATENT DOCUMENTS

| | | | |
|---|---|---|---|
| 2836835 | 3/1980 | Germany | 411/82 |

*Primary Examiner*—Neill R. Wilson
*Attorney, Agent, or Firm*—Kane,Dalsimer,Sullivan,Kurucz, Levy, Eisele and Richard, LLP

[57] ABSTRACT

A construction anchor for mounting an object on a structure of masonry, concrete, metal or the like includes a metal anchoring portion and a plastic cap. The anchor is adapted to be inserted, metal end first, into a pre-drilled adhesive-filled hole. The cap has a flange that is larger than the hole diameter, so that the anchor may be inserted and seated in the hole at a consistent depth. When the adhesive has set, a screw or bolt is inserted through the plastic cap to engage the threads in an internal bore in the anchoring portion. The plastic cap serves not only to determine the depth of the anchor in the hole, but also to prevent adhesive and other material from entering the threaded interior of the anchor prior to use.

28 Claims, 5 Drawing Sheets

ADHESIVE ANCHOR

Matter enclosed in heavy brackets [ ] appears in the original patent but forms no part of this reissue specification; matter printed in italics indicates the additions made by reissue.

BACKGROUND OF THE INVENTION

1. Field of The Invention

The present invention relates to a construction anchor, and more particularly to a construction anchor comprising two parts receivable in a hole defined in structural materials such as masonry, concrete or metal to secure an object or fixture to the surface of the structural material.

2. Description of the Prior Art

Construction anchors of the above-mentioned general type are known in the art. Typically, such anchors are made of metal in a substantially cylindrical shape. They also include a longitudinal threaded bore in which an appropriately sized headed bolt may be disposed.

In use, construction anchors of this general type are adhesively bonded into holes defined in masonry, concrete and similar materials. When the cement or adhesive, perhaps an epoxy, has sufficiently hardened or cured, an object may be mounted on the masonry surface by means of a bolt driven into the threaded bore of the construction anchor.

In the prior art, it has proven to be difficult to set the construction anchors to a uniform depth in the holes drilled in the masonry. In addition, as the cement or adhesive is introduced into the hole before the construction anchor, it has a tendency to be compressed out of the hole as the construction anchor is being introduced thereinto, and to extrude or seep into the threaded bore, where it may harden and prevent a bolt from being readily disposed therein.

The present invention is a construction anchor representing a solution to these deficiencies of the prior art.

SUMMARY OF THE INVENTION

The present invention is a construction anchor having a two-piece construction including a generally cylindrical anchoring portion onto which a cap is snap-fit. The cap covers an axial threaded bore, adapted to receive a bolt, in the anchoring portion. The ultimate purpose of the construction anchor is to securely retain an object against the surface of a structural material such as masonry, concrete or metal.

The cap has a two-fold purpose. It is first provided with an annular flange, intended to sit on the periphery of the hole into which the construction element is to be inserted, so that the construction anchor may be set into the hole at a predetermined depth. The cap also prevents the adhesive used to bond the construction anchor within the hole from entering the internal threads or cavity of the anchoring portion.

The anchoring portion may also have a series of annular grooves defining lobes at its lower end, that is, the innermost end with reference to the hole into which the construction anchor is to be inserted, to provide an interconnection with the adhesive. The upper end of the anchoring portion may have longitudinal splines which serve to prevent rotation of the construction anchor as a bolt is threadingly connected thereto.

The cap may have a plurality of longitudinal raised ridges on its outer surface below the annular flange, so that it may fit snugly within an appropriately dimensioned hole, yet may also permit the adhesive placed in the hole prior to the construction anchor to extrude or seep outward between the raised ridges as the anchor is inserted therein to firmly hold it along its entire length within the hole.

The anchor of the invention is particularly effective in maintaining secure holding power even when subjected to dynamic cyclical loading or vibration. The bolt is installed with an applied initial stress which tends to elongate the bolt and thus overcome "creep" at peak dynamic cyclical loading or the effects of vibration induced by wind or other forces.

The present invention will be described in more complete detail below with frequent reference being made to the accompanying figures, which may be identified as follows.

DETAILED DESCRIPTION OF THE PREFERRED EMBODIMENT

Figure 1:
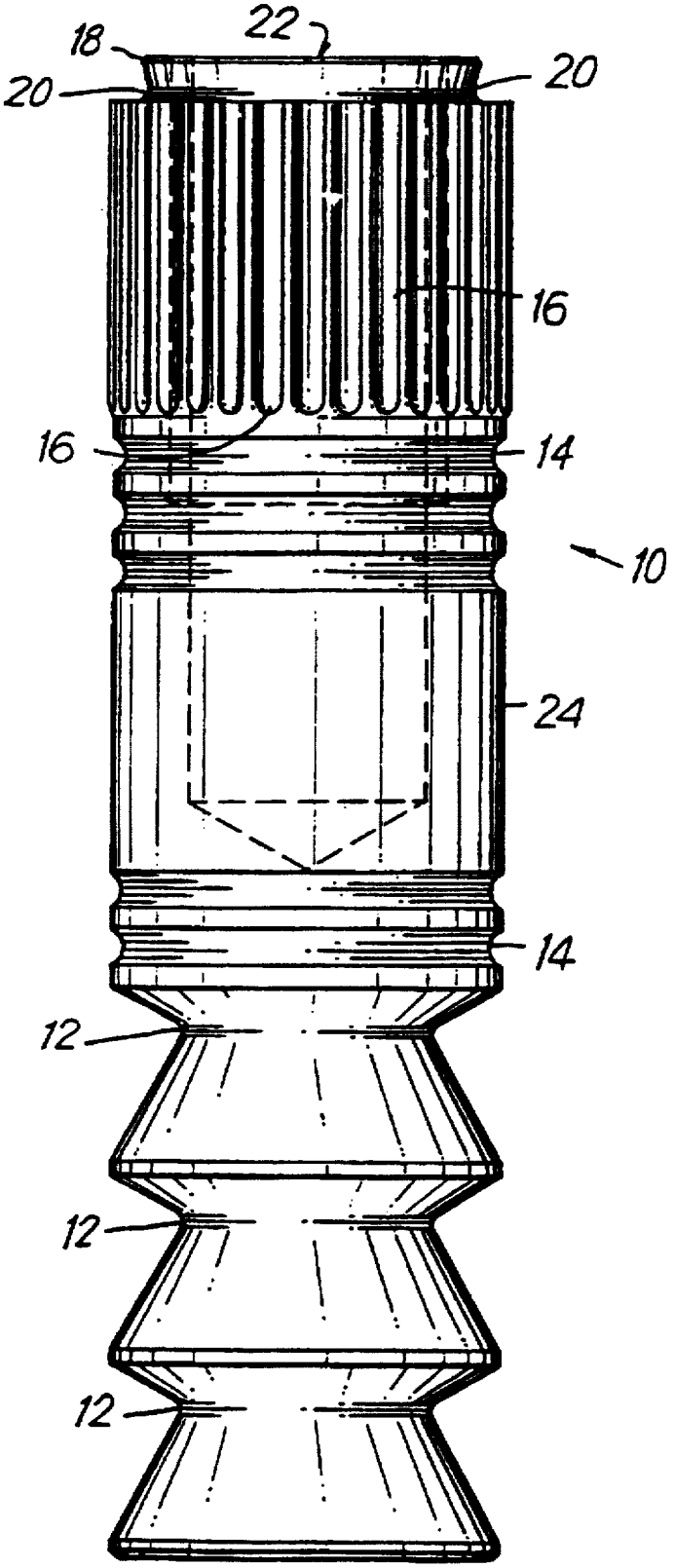
FIG. 1 is a side view of the anchoring portion of the construction anchor.

FIG. 1 prints a side view of the anchoring portion 10 of the construction anchor of the present invention. The lower end of the anchoring portion 10 may be provided with at least one major annular groove 12, and with at least one minor annular groove 14. The major annular grooves 12 are deeper and wider than the minor annular grooves 14. These grooves 12,14 provide an interconnection between the anchoring portion 10 and the adhesive used to hold it within a hole in masonry, so that it may resist extraction therefrom.

The upper end of the anchoring portion 10 has a plurality of longitudinal splines 16. These also provide an interconnection between the anchoring portion 10 and the adhesive, so that the anchoring portion 10 may resist rotation within a hole when a bolt is being threadingly connected thereto.

At the very upper end of the anchoring portion 10 is a narrowed extension 18 having an annular groove 20 thereabout. Annular groove 20 provides a means by which the cap, to be described below, may be attached and provide a tight seal to the anchoring portion 10. A threaded bore 22 is provided in the upper end of the anchoring portion 10, as suggested by the dashed lines in FIG 1.

Figure 2:
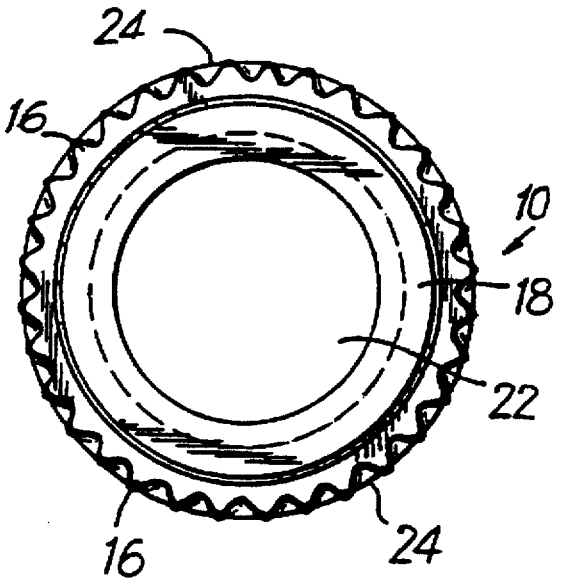
FIG. 2 is a view of an end of the anchoring portion having a threaded bore.

FIG. 2 is a view of the upper end of the anchoring portion 10 showing the threaded bore 22, which is centered in the narrowed extension 18 of the anchoring portion 10. Longitudinal splines 16, extending from below to beyond the level of the unsplined section 24 of the anchoring portion 10, are arranged about the circumference of its surface.

The anchoring portion 10 of the construction anchor is preferably made of metal, such as, for example, zinc-plated steel.

Figure 3:
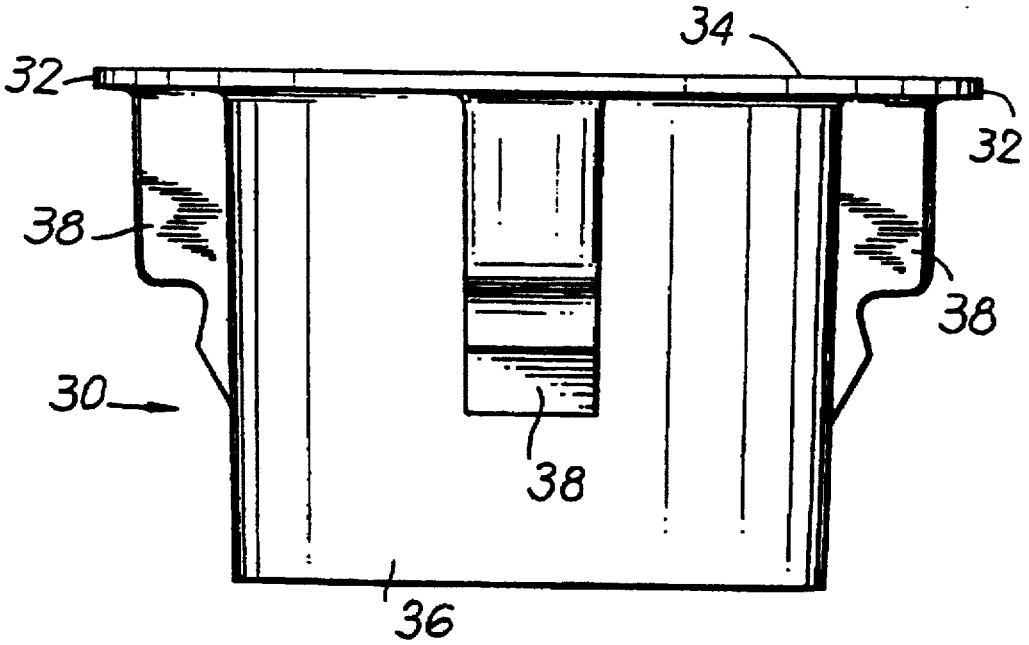
FIG. 3 is a side view of the cap of the construction anchor.

FIG. 3 presents a side view of the cap 30 of the construction anchor. The cap 30 includes an annular flange 32 extending from and forming a continuation of its upper surface 34. Below the annular flange 32, on the outer surface 36 of the cap 30, are a plurality of longitudinal raised ridges 38, whose function will be illustrated below.

Figure 4:
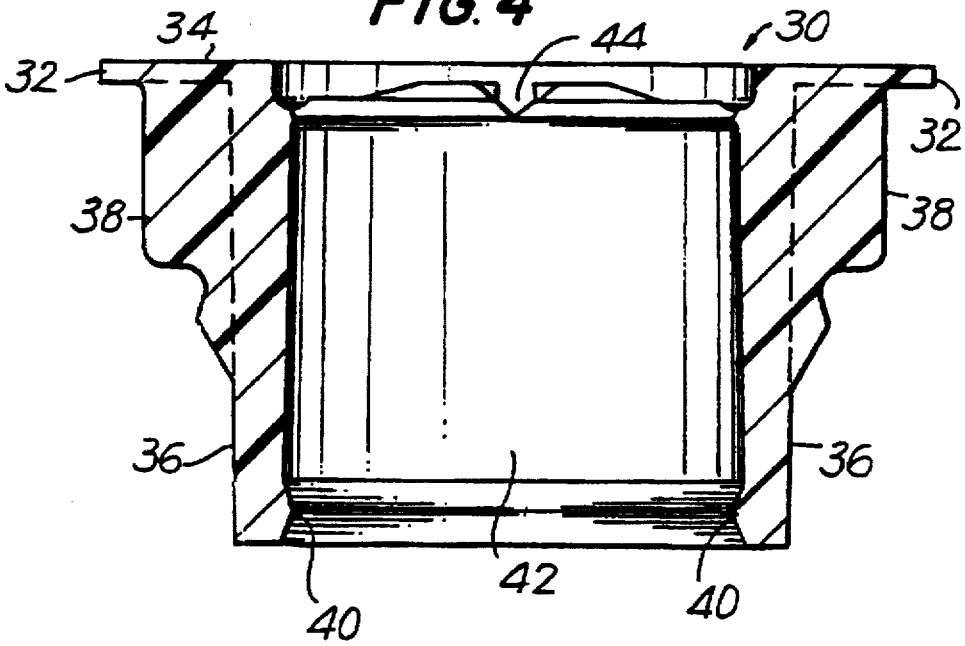
FIG. 4 is a cross-section of the cap of the construction anchor taken along the longitudinal axis thereof and viewed from the side.

FIG. 4 is a cross section of the cap 30 shown in FIG. 3. For present purposes, it is important to note that the bottom of the cap 30 is open, and is provided with an inwardly radial flange 40 at the base of its inner surface 42. Flange 40 snappingly fits into annular groove 20 on the narrowed extension 18 of the anchoring portion 10 to join the cap 30 thereto in a fluidtight seal.

The upper surface 34 of the cap 30 is closed, but is provided with means in a recessed central area 44 enabling central area 44 to be punctured by an instrument, such as the threaded end of a bolt.

Figure 5:
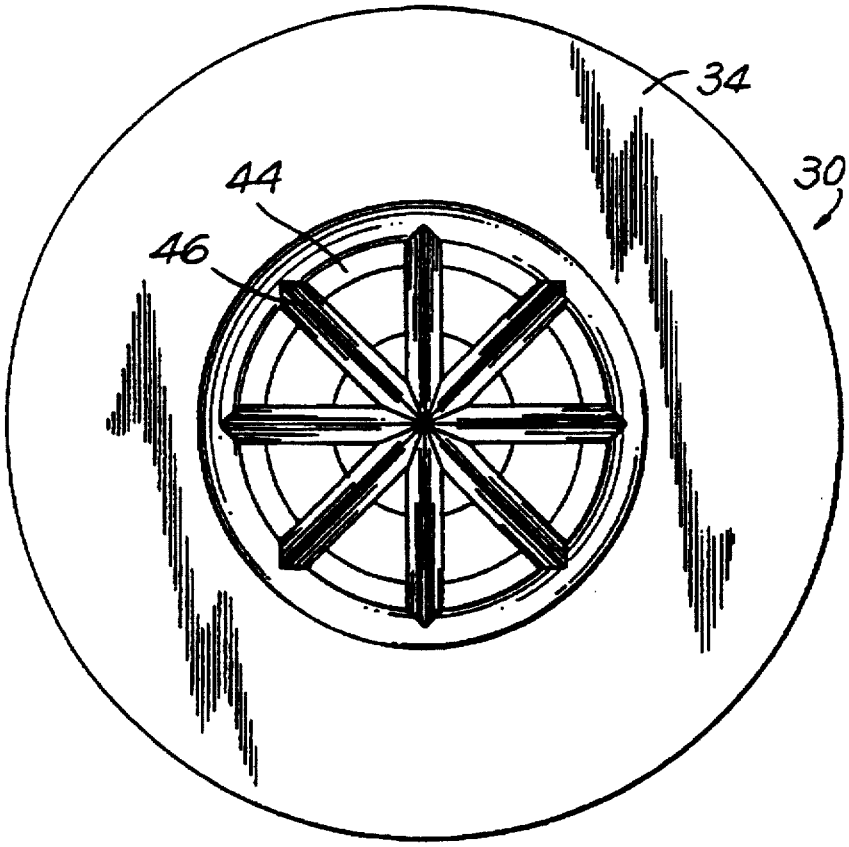
FIG. 5 is a view of the top of the cap of the construction anchor.

In this regard, FIG. 5 presents a view of the top of the cap 30. The upper surface 34 is provided with a recessed central area 44 having a molded, asterisk-shaped series of cuts 46. The cuts 46 represent weak points enabling a threaded end of a bolt to be pushed through the recessed central area 44, after the construction anchor has been adhesively bonded in a hole drilled in masonry or the like, and when such a bolt is to be disposed within threaded bore 22 to mount an object. The cap 30, for this reason, is ideally fashioned from a plastic material, such as polyethylene.

Figure 6:
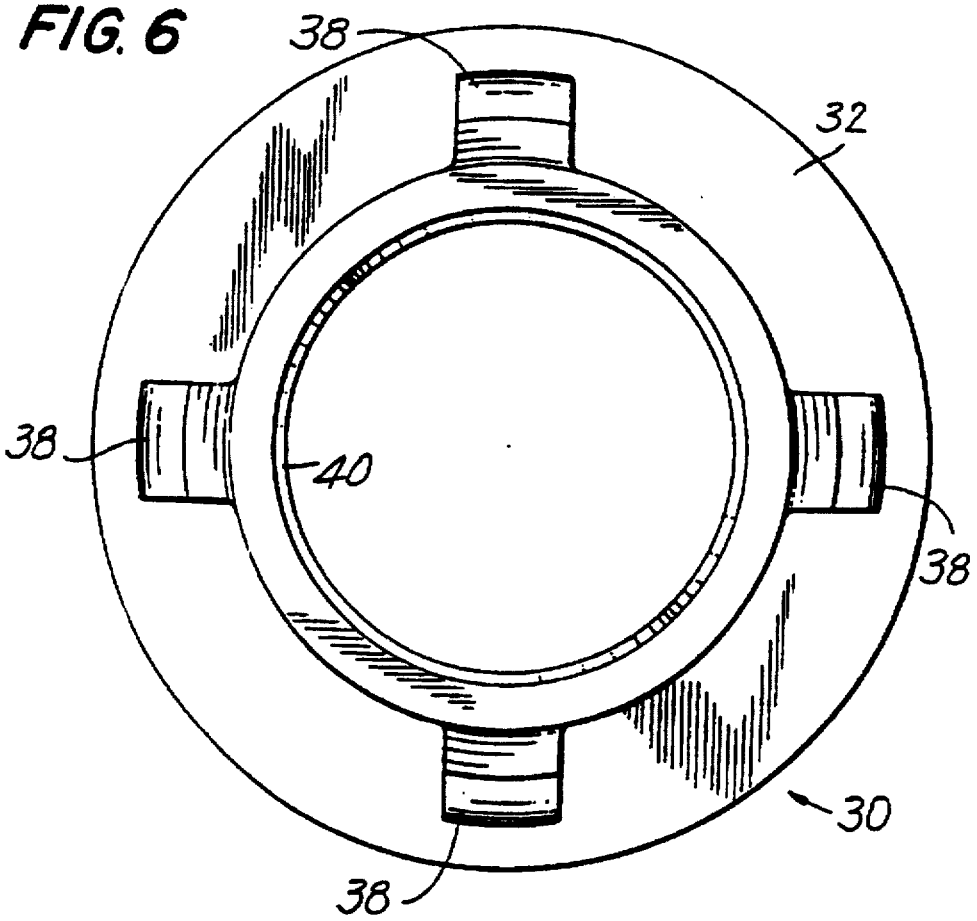
FIG. 6 is a view of the cap from below.

FIG. 6 is a view of the cap 30 from below, and shows flange 40 extending radially about the lower inside edge thereof. Annular flange 32 extends radially beyond the longitudinal raised ridges 38, as may clearly be noted. The construction anchor of the present invention is ideally inserted in a hole of radius slightly smaller than that represented by the maximum radial extent of longitudinal raised ridges 38, so that the construction anchor may be inserted into such hole until the annular flange 32 comes to rest against the edges thereof and prevents any further insertion.

Figure 8:
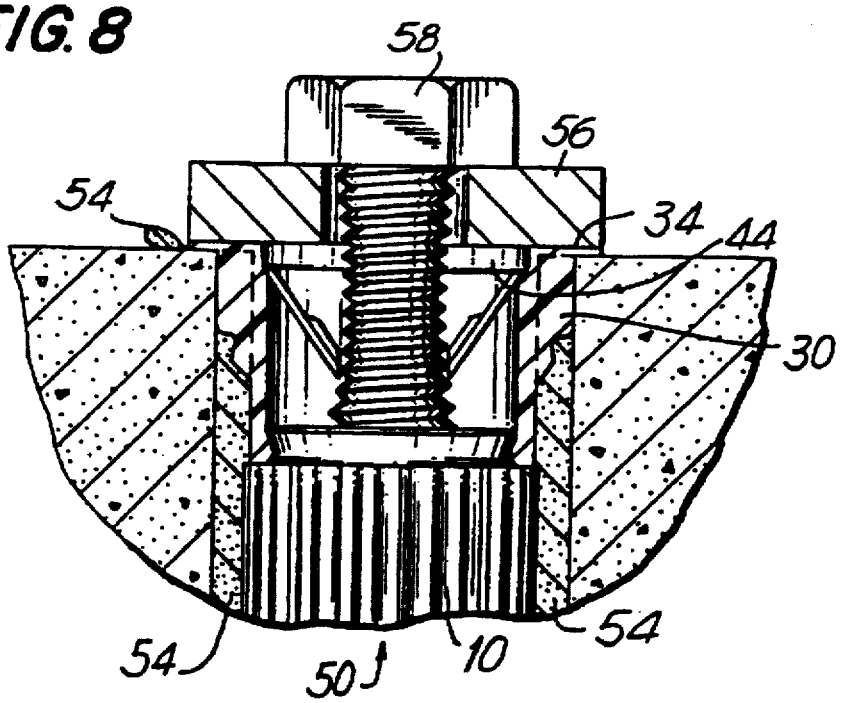
FIGS. 7 and 8 illustrate the use of the construction anchor of the present invention.
Figure 7:
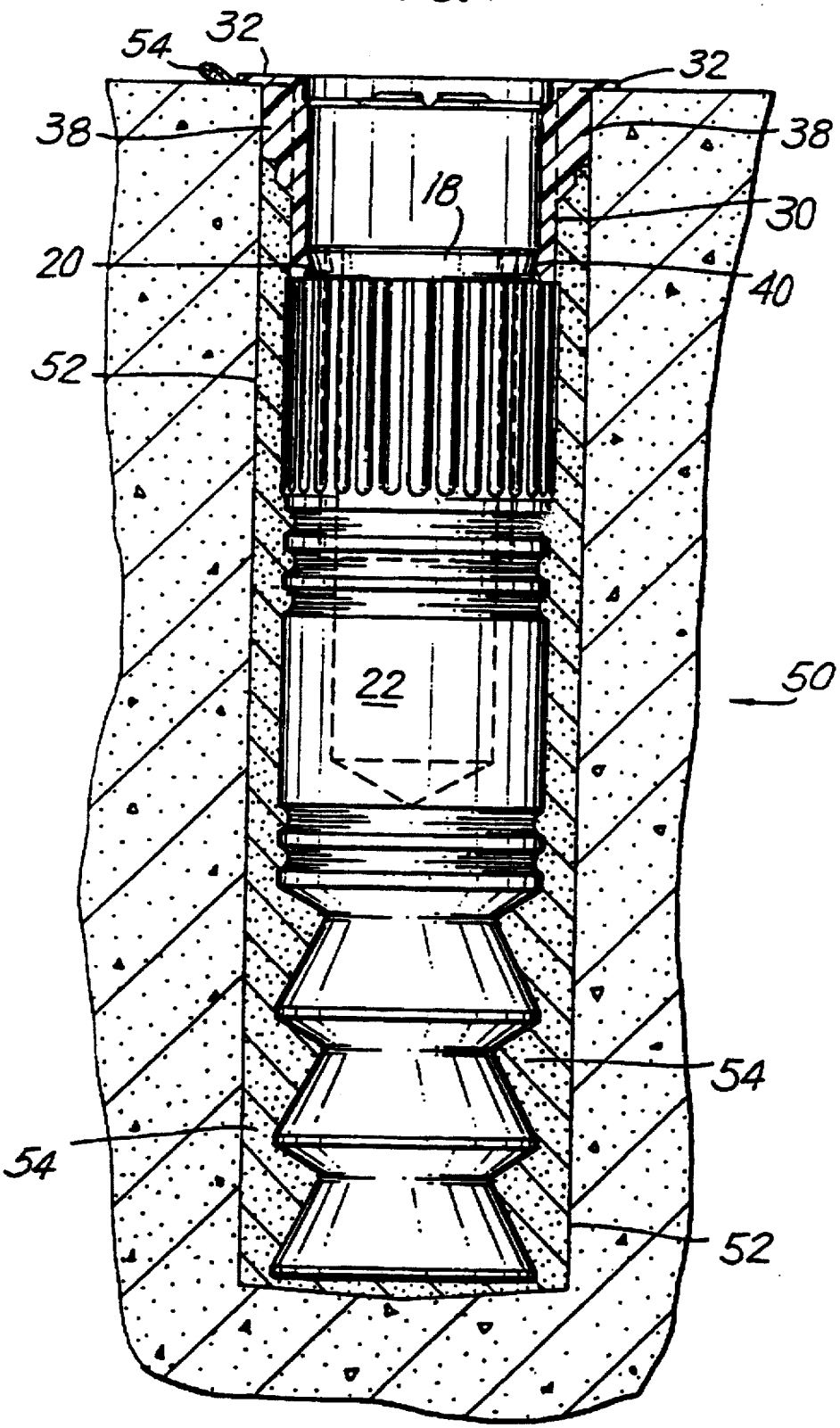

The use of the present construction anchor is shown in FIGS. 7 and 8. The construction anchor 50 is a two-piece construction comprising the cap 30 and the anchoring portion 10, which snappingly fit together through the cooperation of annular groove 20 extending about narrowed extension 18 of the anchoring portion 10 and the radial flange 40 on the inner surface 42 of cap 30.

In practice, a hole 52 of radius slightly smaller than that represented by the maximum radial extent of longitudinal raised ridges 38 is drilled into a concrete wall and the hole 52 is cleaned of debris by brush or air pressure. An injection gun is then used to inject a construction adhesive, such as epoxy 54, into the hole 52. Thereafter, the construction anchor 50 of the present invention is inserted into the hole 52 with the annular flange 32 on cap 30 positioning the construction anchor 50 at a predetermined depth into the hole 52. As the construction anchor 50 is inserted into the hole 52, it becomes immersed in the epoxy 54 previously injected thereinto. The cap 30 prevents the epoxy 54 from entering into the threaded bore 22 in the anchoring portion 10, and also seats the construction anchor 50 when the annular flange 32 engages the concrete wall adjacent to the hole 52.

Referring to FIG. 8, a fixture 56 to be attached to the wall is then positioned over the construction anchor 50 and a mounting bolt 58 is inserted through the a pre-drilled hole in fixture 56 and through the molded, asterisk-shaped series of cuts 46 in the recessed central area 44 on the upper surface 34 of the cap 30. The bolt 58 is then threadingly engaged into the threaded bore 22 of the anchoring portion 10, and firmly tightened to secure fixture 56 to the wall. The tightening of the bolt 58 applies an initial stress which tends to elongate the bolt between the head and the connection to the anchor, with the attendant operational advantages mentioned above. The elongation of the bolt is exaggerated in FIG. 8 to illustrate the principle.

Modifications to the invention described above would be obvious to those skilled in the art, and would not bring the invention so modified beyond the scope of the appended claims.

What is claimed is:

1. A construction anchor for retaining an object against[,] a structure of masonry, concrete, metal or the like, said construction anchor, in use, being secured within a hole defined in said structure, comprising:

a cylindrical anchoring portion having a threaded axial bore extending partially through said anchoring portion from one end thereof; and a cap adapted to be snap-fit over said end to cover said threaded axial bore, said cap having an annular flange seatable on the periphery of said hole, so that said construction anchor may be set into said hole at a predetermined and consistent depth.

2. A construction anchor as claimed in claim 1 wherein said cylindrical anchoring portion is made of metal.

3. A construction anchor as claimed in claim 2 wherein said metal is zinc-plated steel.

4. A construction anchor as chimed in claim 1 wherein said cap is of a plastic material.

5. A construction anchor as claimed in claim 4 wherein said plastic material is polyethylene.

6. A construction anchor as claimed in claim 1 wherein said cylindrical anchoring portion has at least one first annular groove.

7. A construction anchor as claimed in claim 6 wherein said cylindrical anchoring portion has at least one second annular groove, said second annular groove being narrower in a longitudinal direction along said cylindrical anchoring portion than said first annular groove.

8. A construction anchor as claimed in claim 1 wherein said cylindrical anchoring portion has a plurality of annular grooves.

9. A construction anchor as claimed in claim 8 wherein said plurality of annular grooves includes at least one first annular groove and at least one second annular groove, said first annular groove being deeper than sa annular groove.

10. A construction anchor as claimed in claim 1 wherein said cylindrical anchoring portion has a plurality of longitudinal splines.

11. A construction anchor as claimed in claim 1 wherein said end of said cylindrical anchoring portion having said threaded axial bore has a narrowed extension with an annular groove extending thereabout, and said cap has an annular flange extending about the base of its inner surface, so that said cap may be snap-fit onto said cylindrical anchoring portion.

12. A construction anchor as claimed in claim 1 wherein said cap has an outer surface, said outer surface having a plurality or longitudinal raised ridges for disposing said construction anchor evenly within said hole in said structure.

13. A construction anchor as claimed in claim 1 wherein said cap has an upper surface, said annular flange being an extension or said upper surface, said upper surface being puncturable by the threaded end of a bolt to be secured within said construction anchor.

*14. A construction anchor for retaining an object against a structure of masonry, concrete, metal or the like, said construction anchor, in use, being secured within a hole defined in said structure, said construction anchor comprising a cylindrical member having a first end, a second end*

*and a longitudinal axis, a threaded axial bore extending partially therethrough from said first end, and at least one first annular groove around said second end, thereby providing a lobe in said cylindrical member at said second end, said lobe having a surface oriented obliquely with respect to said longitudinal axis, said threaded axial bore terminating within said cylindrical member short of said at least one first annular groove and a cap tightly fitted upon said first end to cover said threaded axial bore.*

*15. A construction anchor as claimed in claim 14 wherein said cylindrical member is made of metal.*

*16. A construction anchor as claimed in claim 15 wherein said metal is zinc-plated steel.*

*17. A construction anchor as claimed in claim 14 wherein said cylindrical member has at least one second annular groove, said at least one second annular groove being narrower in a longitudinal direction along said cylindrical member than said at least one first annular groove.*

*18. A construction anchor as claimed in claim 17 wherein said at least one first annular groove is deeper than said at least one second annular groove.*

*19. A construction anchor as claimed in claim 14 wherein said cylindrical anchoring portion has at least one longitudinal spline at said first end.*

*20. A construction anchor as claimed in claim 14 wherein said cylindrical anchoring portion has a plurality of longitudinal splines at said first end.*

*21. A construction anchor as claimed in claim 14 wherein said at least one first annular groove is a plurality of first annular grooves, each of said plurality being separated from one adjacent thereto by a lobe.*

*22. A construction anchor as claimed in claim 14 wherein said cap is of a plastic material.*

*23. A construction anchor as claimed in claim 22 wherein said plastic material is polyethylene.*

*24. A construction anchor as claimed in claim 14 wherein said first end of said cylindrical anchoring portion having said threaded axial bore has a narrowed extension with an annular groove extending thereabout, and said cap has an annular flange extending about the base of its inner surface, so that said cap may be snap-fit onto said cylindrical anchoring portion.*

*25. A construction anchor as claimed in claim 14 wherein said gap has an outer surface, said outer surface having a plurality of longitudinal raised ridges for disposing said construction anchor evenly within said hole in said structure, said longitudinal raised ridges centering and suspending said construction anchor in said hole.*

*26. A construction anchor as claimed in claim 14 wherein said cap has an upper surface, said upper surface being puncturable by the threaded end of a bolt to be secured within said construction anchor, said upper surface protecting said threaded axial bore from dirt.*

*27. A construction anchor as claimed in claim 26 wherein said upper surface of said cap and said threaded axial bore of said cylindrical anchoring portion are separated by a distance providing a stretch zone for a bolt.*

*28. A construction anchor as claimed in claim 14 wherein said cap has an annular flange seatable on the periphery of said hole, so that said construction anchor may be set into said hole at a predetermined and consistent depth.*

* * * * *